United States Patent
Lai

(10) Patent No.: US 8,931,940 B2
(45) Date of Patent: Jan. 13, 2015

(54) VEHICLE LAMP MODULE

(71) Applicant: Hon Hai Precision Industry Co., Ltd., New Taipei (TW)

(72) Inventor: Chih-Chen Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/014,391

(22) Filed: Aug. 30, 2013

(65) Prior Publication Data

US 2014/0177252 A1 Jun. 26, 2014

(30) Foreign Application Priority Data

Dec. 26, 2012 (TW) .............................. 101150013 A

(51) Int. Cl.
*F21S 8/10* (2006.01)
*B60Q 1/08* (2006.01)
*B60Q 1/12* (2006.01)
*B60Q 1/14* (2006.01)

(52) U.S. Cl.
CPC ............. *F21S 48/1757* (2013.01); *B60Q 1/085* (2013.01); *B60Q 1/122* (2013.01); *B60Q 1/1423* (2013.01); *F21S 48/1154* (2013.01); *F21S 48/1388* (2013.01); *F21S 48/1394* (2013.01); *F21S 48/215* (2013.01); *F21S 48/232* (2013.01); *B60Q 2300/21* (2013.01); *B60Q 2300/314* (2013.01)
USPC .......................................................... 362/514

(58) Field of Classification Search
USPC .................... 362/514, 494, 540, 545
See application file for complete search history.

(56) References Cited

U.S. PATENT DOCUMENTS

| | | | |
|---|---|---|---|
| 2008/0043481 A1* | 2/2008 | Yokoyama et al. | 362/465 |
| 2012/0275174 A1* | 11/2012 | Takahashi et al. | 362/487 |

* cited by examiner

*Primary Examiner* — Tracie Y Green
(74) *Attorney, Agent, or Firm* — Novak Druce Connolly Bove + Quigg LLP

(57) ABSTRACT

An exemplary vehicle lamp module includes a lighting module and a controlling system for controlling the lighting module. The lighting module includes a light source, a reflecting mirror arranged on the light path of the light source and a reflecting cup. Light emitted from the light source is reflected to the reflecting cup by the reflecting mirror. The reflecting mirror is moveable relative to the reflecting cup, by which, a direction of the light reflected to the reflecting cup is capable of being changed by moving the reflecting mirror relative to the reflecting cup correspondingly, such that light reflected to the reflecting cup by the reflecting mirror is capable of being reflected by the reflecting cup to the far front side, near front side and lateral sides of the vehicle by moving the reflecting mirror correspondingly.

17 Claims, 4 Drawing Sheets

VEHICLE LAMP MODULE

BACKGROUND

1. Technical Field

The present disclosure generally relates to light sources and, more particularly, to a vehicle lamp module which uses a light emitting diode (LED) light source and a rotatable reflecting mirror to adjust the light pattern of light from the LED light source.

2. Description of Related Art

A conventional vehicle lamp module includes a substrate, a light source mounted on the substrate and a reflector surrounding the light source therein. Light emitted from the light source is reflected by the reflector to a front side of the vehicle in a narrow area to illuminate, when the vehicle lamp functions as a head light of the vehicle; and light emitted from the light source is reflected by the reflector to a rear side of the vehicle in a narrow area to illuminate, when the vehicle lamp module functions as a tail light of the vehicle.

However, because the vehicle lamp module can only emits light towards the front side or the rear side of the vehicle, and can not emits light towards lateral sides of the vehicle. It makes the driver won't see the road in lateral sides of the vehicle when turning right or turning left, resulting in vulnerability to the driver. Furthermore, for the conventional vehicle lamp functioning as the headlamp, it requires two separate bulbs to respectively emit the low beam and the high beam, whereby the conventional headlamp has a complicated structure.

Therefore, what is needed, is a vehicle lamp module which can overcome the limitations described above.

DETAILED DESCRIPTION

Embodiments of a vehicle lamp module of the present disclosure will now be described in detail below and with reference to the drawings.

Figure 1:
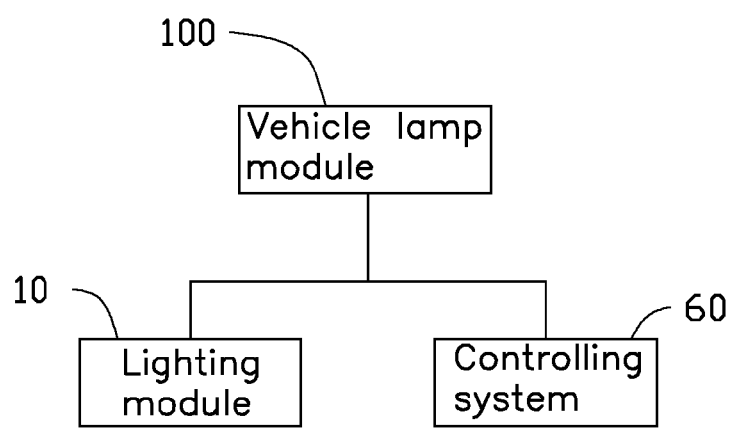
FIG. 1 is a structure diagram of a vehicle lamp module in accordance with a first exemplary embodiment of the present disclosure.

Referring to FIG. 1, a vehicle lamp module 100 includes a lighting module 10 and a controlling system 60 for controlling the lighting module 10.

Figure 2:
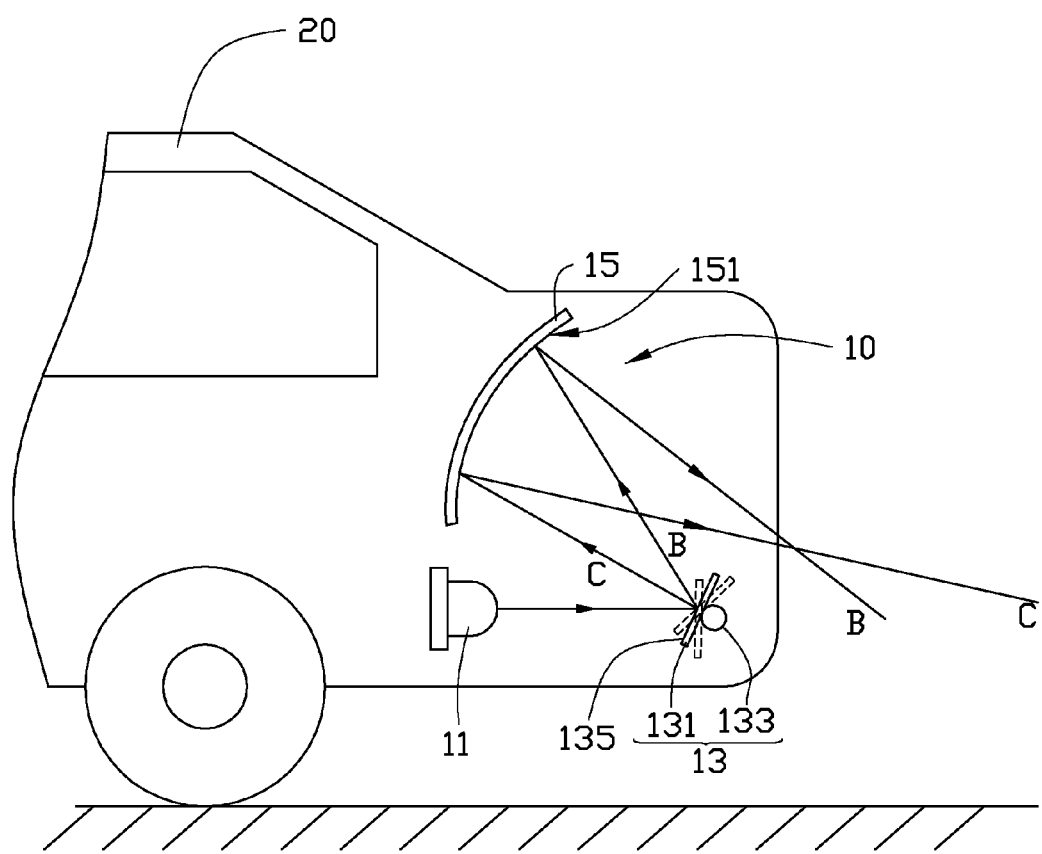
FIG. 2 is a schematic view showing light paths of the vehicle lamp module assembled in a vehicle.

Referring to FIG. 2, the lighting module 10 is assembled in a vehicle 20. In this embodiment, the lighting module 10 is assembled in a front side of the vehicle 20 as a headlight. Alternatively, the lighting module 10 can also be assembled in a rear side of the vehicle 20 as a taillight, although the lighting module 10 is mainly used as a headlight.

The lighting module 10 includes a light source 11, a reflecting mirror 13 arranged on the light path of the light source 11 and a reflecting cup 15. Light emitted from the light source 11 is reflected to the reflecting cup 15 by the reflecting mirror 13. The orientation of the reflecting mirror 13 can be adjusted relatively to the reflecting cup 15, by which, a direction of the light reflected to the reflecting cup 15 by the reflecting mirror 13 can be changed correspondingly. Therefore, light reflected to the reflecting cup 15 by the reflecting mirror 13 is capable of being reflected by the reflecting cup 15 to the far front side (i.e., light beam C) or the near front side (i.e., light beam B) of the vehicle 20 at different distances, so as to make the driver see the road at the far front side and the near front side of the vehicle 20 in a dark environment. In this embodiment, the reflecting mirror 13 is capable of being rotated in the vehicle 20 and relative to the reflecting cup 15.

The light source 11 includes a plurality of light emitting diodes (LEDs). Alternatively, the light source 11 includes a plurality of laser LEDs.

Accordingly, when the lighting module 10 functions as a tail light of the vehicle 20, light reflected to the reflecting cup 15 by the reflecting mirror 13 can be reflected by the reflecting cup 15 to the far rear side or the near rear side of the vehicle 20 in a dark environment.

The reflecting mirror 13 includes a reflecting plate 131 and a wheel 133. A front side of the reflecting plate 131 faces towards the light source 11, and the wheel 133 is located on a back side of the reflecting plate 131. In this embodiment, the reflecting plate 131 can rotate with the wheel 133. The wheel 133 can not only rotate the reflecting plate 131 in a vertical plane to cause the light from the light source 11 to form a low beam or a high beam but also in a horizontal plane to cause the light from the light source 11 to be directed a left side or a right side of the vehicle 20 whereby the lighting module 10 can also be used as a turnable headlight following a steering movement of the vehicle 20. Preferably, a reflecting film 135 is coated on a front surface of the reflecting plate 131 to reflect the light from the light source 11 efficiently to the reflecting cup 15. The reflecting film 135 can have a phosphor layer which can convert blue light from the light source 11 into white light and a diffusion layer which can covert point light from the light source 11 into plane light.

The reflecting cup 15 represents a bowl shape, and includes a reflecting surface 151 recessed away from the reflecting mirror 13. The reflecting surface 151 is an arc-shaped surface. The reflecting surface 151 can be a smooth surface or a roughed surface. Preferably, a reflecting film can be coated on the reflecting surface 151 to improve the reflecting efficiency.

Figure 3:
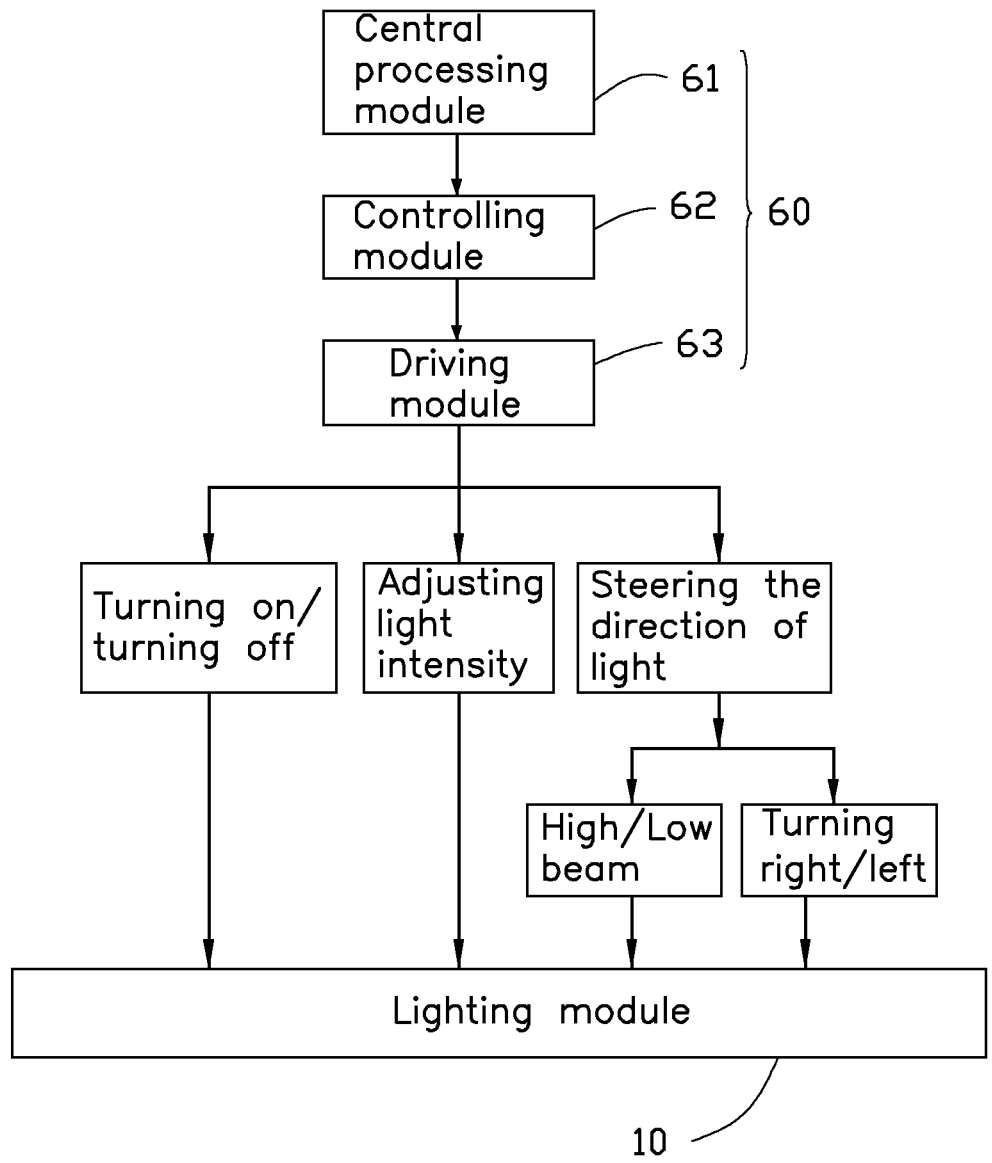
FIG. 3 is a control flow chart of a controlling module in the vehicle lamp module in FIG. 2.

Referring to FIG. 3, the controlling system 60 includes a central processing module 61, a controlling module 62 and a driving module 63.

The central processing module 61 sends instructions to the controlling module 62. The controlling module 62 receives the instructions from the central processing module 61 to control the driving module 63. The driving module 63 drives the lighting module 10 to function according to the instructions.

In this embodiment, the instructions sent by the central processing module 61 includes an instruction of turning on the lighting module 10, an instruction of turning off the lighting module 10, an instruction of adjusting the light intensity of the lighting module 10, and an instruction of steering the direction of the light from the lighting module 10.

The central processing module 61 can be fixed in the vehicle 20. Preferably, the central processing module 60 can be located at a position, where the driver can easily control the central processing module 61. Alternatively, the central processing module 61 can include a plurality of buttons or a touch panel (not shown), whereby, the driver can easily send instructions by pressing the corresponding buttons or touch the touch panel.

In this embodiment, when the driver drives the vehicle 20 assembled with the vehicle lamp module 100, the driver can send any instructions mentioned above to the controlling module 62 through the central processing module 61. And when the controlling module 62 receives the instructions sent by the driver, the controlling module 62 controls the driving module 63 to drive the lighting module 30 to function according to the instructions, such as turning on/off the lighting module 10, and so on.

Also referring to FIG. 2, in a dark environment, when a driver wants to see the road at a position near the front side of the vehicle 20, the driver can send the instruction of steering the light direction of lighting module 10 to the controlling module 62 through the central processing module 61. The controlling module 62 controls the reflecting plate 131 of the reflecting mirror 13 to rotate clockwise with the wheel 133. When the reflecting plate 131 rotates with the wheel 133 clockwise, light emitted from the light source 11 can be reflected by the reflecting plate 131 towards upside of the reflecting surface 151 of the reflecting cup 15 (such as light beam B, i.e. a low beam). And this part of light emitting towards the upside of the reflecting surface 151 is reflected by the reflecting surface 151 towards a position near the front side of the vehicle 20, such that, the driver can see the road near the front side of the vehicle 20.

Accordingly, in a dark environment, when the driver wants to see the road at a position far away from the front side of the vehicle 20, the driver can send the instruction of steering the light direction of lighting module 10 to the controlling module 62 through the central processing module 61. The controlling module 62 controls the reflecting plate 131 of the reflecting mirror 13 to rotate counterclockwise with the wheel 133. When the reflecting plate 131 rotates with the wheel 133 counterclockwise, light emitted from the light source 11 can be reflected by the reflecting plate 131 towards downside of the reflecting surface 151 of the reflecting cup 15 (such as light beam C, i.e., a high beam). And this part of light emitting towards the downside of the reflecting surface 151 is reflected by the reflecting surface 151 towards the position far away from the front side of the vehicle 20, such that, the driver can see the road far away from the front side of the vehicle 20.

And, when the vehicle 20 turns right, the turning movement of the steering wheel of the vehicle 20 can send the instruction of steering the light direction of lighting module 10 to the controlling module 62 through the central processing module 61. The controlling module 62 controls the reflecting plate 131 of the reflecting mirror 13 to rotate with the wheel 133 towards the left side of the vehicle 20. When the reflecting plate 131 rotates with the wheel 133 towards the left side of the vehicle 20, light emitted from the light source 11 can be reflected towards the left side of the reflecting surface 151. This part of light (not shown) is reflected towards the right side of the vehicle 20 by the left side of the reflecting surface 151 accordingly, such that the driver can see the right side of the vehicle 20 more clearly when the vehicle 20 is being turned to the right.

Similarly, when the vehicle 20 turns left, the controlling module 62 controls the reflecting plate 131 of the reflecting mirror 13 to rotate with the wheel 133 towards the right side of the vehicle 20 according to the instruction sent by the central processing module 61. Accordingly, light emitted from the light source 11 can be reflected by the reflecting surface 151 towards the left side of the vehicle 20, such that the driver can see the left side of the vehicle 20 more clearly when the vehicle 20 is being turned to the left.

Figure 4:
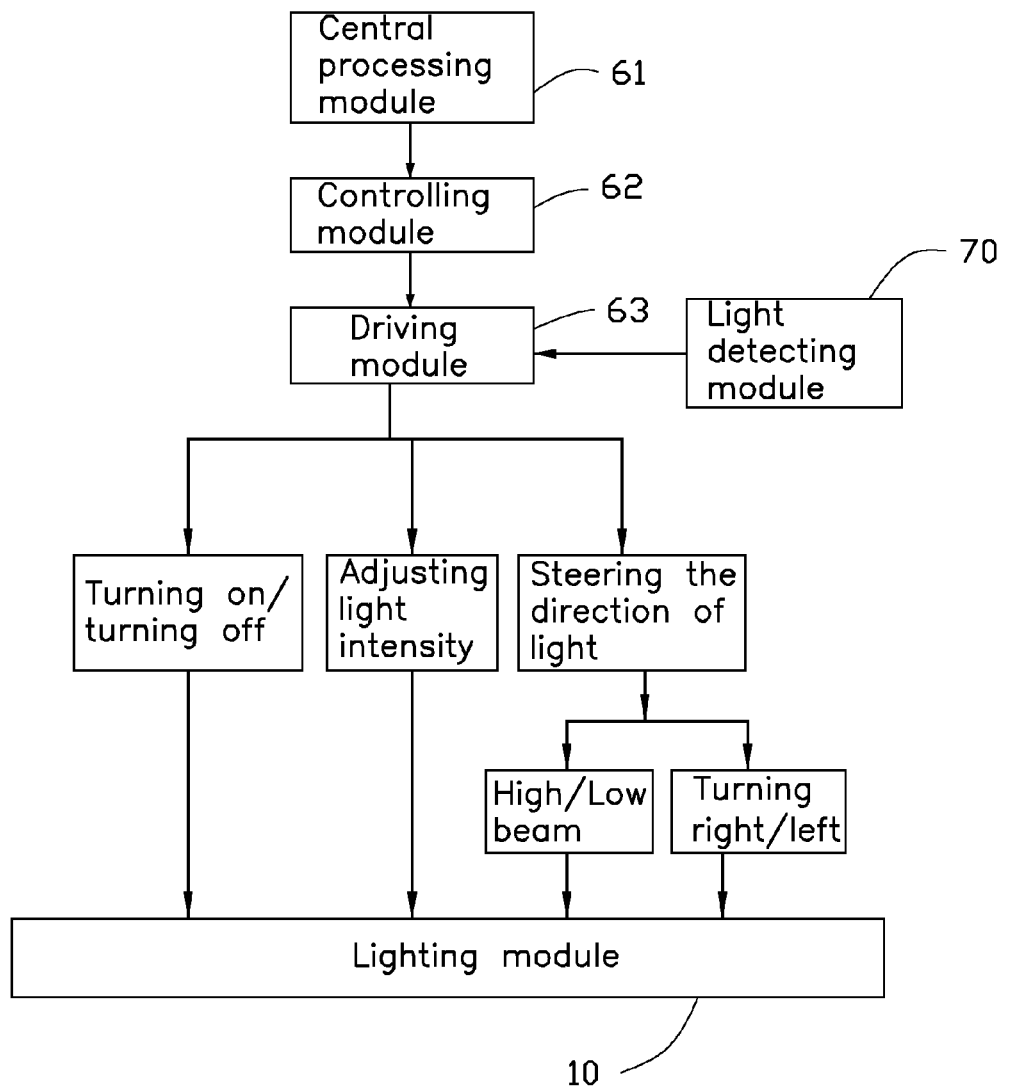
FIG. 4 is a control flow chart of another controlling module in accordance with a second exemplary embodiment.

Referring to FIG. 4, in a second embodiment of the present disclosure, the vehicle lamp module 100 further includes a light detecting module 70. The light detecting module 70 is used to detect the light intensity outside the vehicle 20, and sends instructions of adjusting the light intensity of the lighting module 10 to the controlling module 62. In this embodiment, a default of light intensity is set preliminarily in the light detecting module 70.

When light intensity around the vehicle 20 is above the default, the light detecting module 70 send an instruction of decreasing the light intensity of the lighting module 10 to the controlling module 62. The controlling module 62 controls the lighting module 10 to decrease the light intensity of the lighting module 10 according to the instruction sent by the light detecting module 70.

Conversely, when the light intensity around the vehicle 20 is below the default, the light detecting module 70 sends an instruction of increasing the light intensity of the lighting module 10 to the controlling module 62. The controlling module 61 controls the lighting module 10 to increase the light intensity of the lighting module 10. According to the light detecting module 70, light intensity of the lighting module 10 can be adjusted automatically according to the light intensity around the vehicle 20, which makes the vehicle lamp module 100 be more economical in energy consumption. In this embodiment, the light detecting module 70 includes a plurality of optical sensors and at least a central processing unit (not shown).

According to the vehicle lamp module 100, light direction of the lighting module 10 can be controlled by rotating the reflecting plate 131 with the wheel 133, such that the direction of light from the lighting module 10 can be changed towards the far front side, near front side and lateral sides of the vehicle 20 correspondingly, which increases the safety of the driver when driving a vehicle in a dark environment, especially when the vehicle is driven on a winding mountain road.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A vehicle lamp module comprising:
a lighting module; and
a controlling system for controlling the lighting module,
the lighting module comprising a light source, a reflecting mirror arranged on the light path of the light source and a reflecting cup, light emitted from the light source being reflected to the reflecting cup by the reflecting mirror, the reflecting mirror being moveable relative to the reflecting cup, by which, a direction of the light reflected to the reflecting cup capable of being changed by moving the reflecting mirror relative to the reflecting cup correspondingly, such that light reflected to the reflecting cup by the reflecting mirror capable of being reflected by the reflecting cup to the far front side, near front side and lateral sides of the vehicle by moving the reflecting mirror correspondingly; and
wherein the reflecting cup is bowl shaped, and the reflecting surface of the reflecting cup is recessed away from the reflecting mirror.

2. The vehicle lamp module of claim 1, wherein the reflecting mirror is rotatable relative to the reflecting cup to change the travelling direction of the light reflected by the reflecting mirror to the reflecting cup.

3. The vehicle lamp module of claim 2, wherein the reflecting mirror comprises a reflecting plate and a wheel, and the reflecting plate is capable of rotating with the wheel relative to the reflecting cup.

4. The vehicle lamp module of claim 3, wherein a reflecting film is coated on a front surface of the reflecting plate towards the light source.

5. The vehicle lamp module of claim 1, wherein the controlling system comprises a central processing module, a controlling module and a driving module, the central processing module sends instructions to the controlling module, the controlling module controls the driving module to drive the reflecting mirror to move relative to the reflecting cup according to the instructions sent by the central processing module.

6. The vehicle lamp module of claim 5, wherein the instructions sent by the central processing module comprise an instruction of turning on the light source of the lighting module, an instruction of turning off the light source of the lighting module, an instruction of steering the direction of the light of the lighting module, and an instruction of adjusting the light intensity of the lighting module.

7. The vehicle lamp module of claim 6, further comprising a light detecting module, wherein the light detecting module detects the light intensity around the vehicle, and sends the instruction of adjusting the light intensity of the lighting module to drive the lighting module to change the light intensity.

8. The vehicle lamp module of claim 7, wherein a default of a light intensity is set preliminarily, when the light intensity detected by the light detecting module is above the default, the light detecting module sends the instruction of decreasing the light intensity of the lighting module; when the light intensity detected by the light detecting module is below the default, the light detecting module sends the instruction of increasing the light intensity of the lighting module.

9. The vehicle lamp module of claim 1, wherein the reflecting surface of the reflecting cup is a smooth surface or a rough surface.

10. The vehicle lamp module of claim 9, wherein the reflecting surface of the reflecting cup is arc-shaped.

11. The vehicle lamp module of claim 10, wherein the light source is a light emitting diode (LED) light source.

12. The vehicle lamp module of claim 11, wherein the LED light source is a laser LED light source.

13. The vehicle lamp module of claim 12, wherein the reflecting mirror has a phosphor layer thereon, which coverts light from the laser LED light source from a color to another color.

14. The vehicle lamp module of claim 13, wherein the reflecting mirror has a diffusion layer thereon, which converts point light from the laser LED light source to a plane light.

15. A lighting module comprising:
a light source;
a reflecting mirror arranged on the light path of the light source for reflecting light from the light source; and
a reflecting cup, light emitted from the light source being reflected to the reflecting cup by the reflecting mirror, the reflecting mirror comprising a reflecting plate and a wheel, the reflecting plate being rotatable with the wheel, by which, a direction of the light reflected to the reflecting cup capable of being changed correspondingly; and
wherein the reflecting cup is bowl shaped, and the reflecting surface of the reflecting cup is recessed away from the reflecting mirror.

16. The lighting module of claim 15, wherein the light source is an LED light source.

17. The lighting module of claim 16, wherein a reflecting film is coated on the reflecting surface of the reflecting cup, and the reflecting film comprises a phosphor layer and a diffusion layer.

\* \* \* \* \*